United States Patent [19]

Aspel

[11] 3,906,634
[45] Sept. 23, 1975

[54] METHOD OF MARKING ARCHWIRE WITH TOOTH WIDTH MEASUREMENTS

[76] Inventor: Thomas E. Aspel, 3149 Old Post Rd., Bonsall, Calif. 92003

[22] Filed: Dec. 19, 1974

[21] Appl. No.: 534,207

[52] U.S. Cl. ..................... 32/14 C; 32/40 R; 32/71
[51] Int. Cl.² .................................... A61C 7/00
[58] Field of Search...... 32/40 R, 14 R, 1, 71, 14 C; 33/174 D, 189

[56] References Cited
UNITED STATES PATENTS
3,667,129   6/1972   Aspel .................................. 33/189

Primary Examiner—Hugh R. Chamblee
Assistant Examiner—J. Q. Lever
Attorney, Agent, or Firm—Duane C. Bowen

[57] ABSTRACT

Proportional dividers, set at a ratio of about 6.0:7.2, are used to transfer tooth width measurements from a patient's model to an archwire in a manner increasing measurements to allow for factors such as the greater circumferential length of the archwire relative to the combined widths of associated teeth.

2 Claims, 12 Drawing Figures

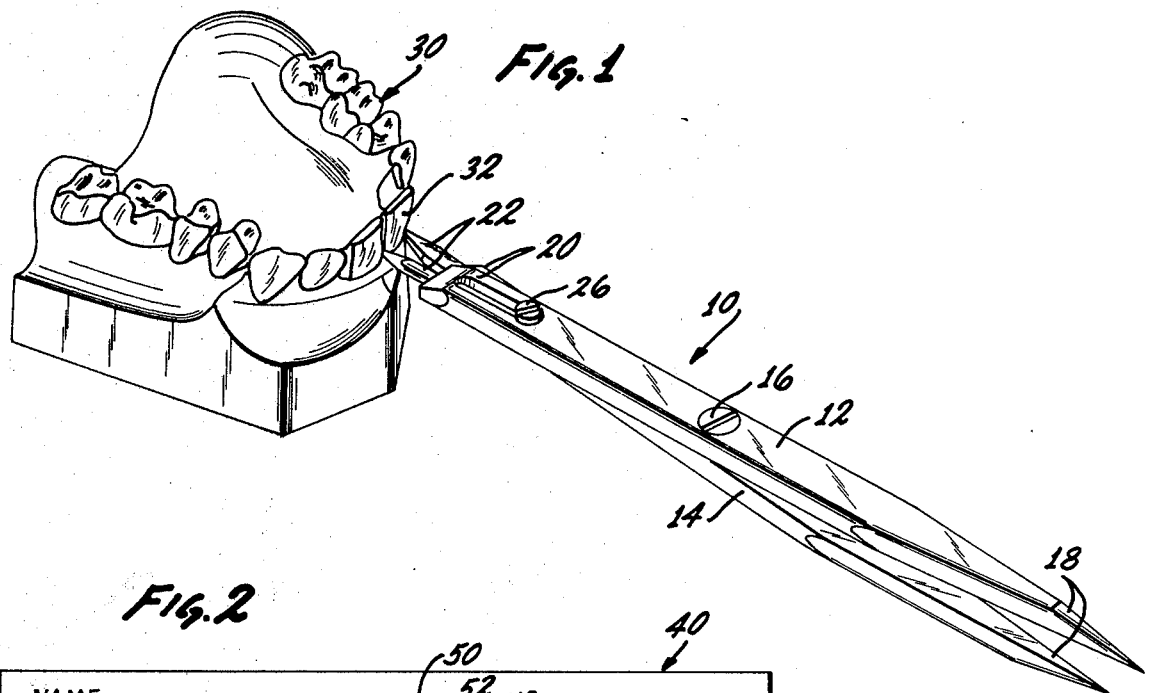
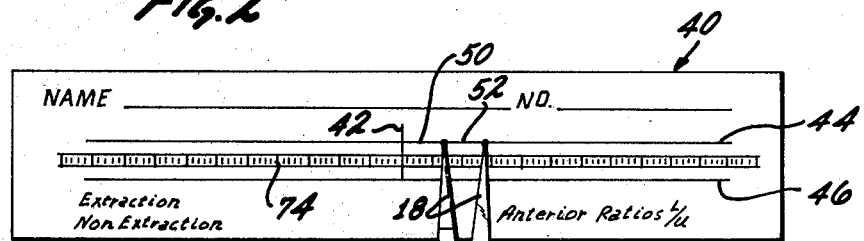
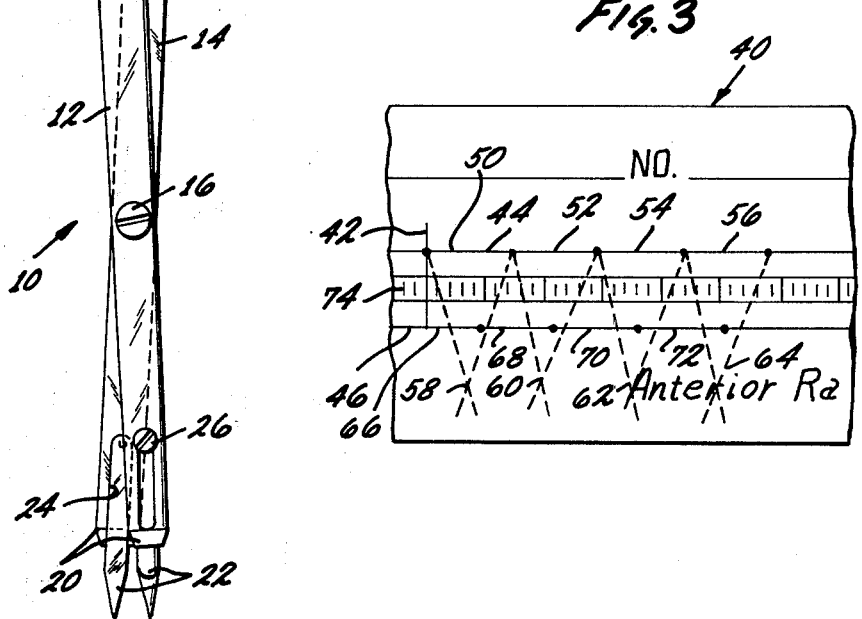

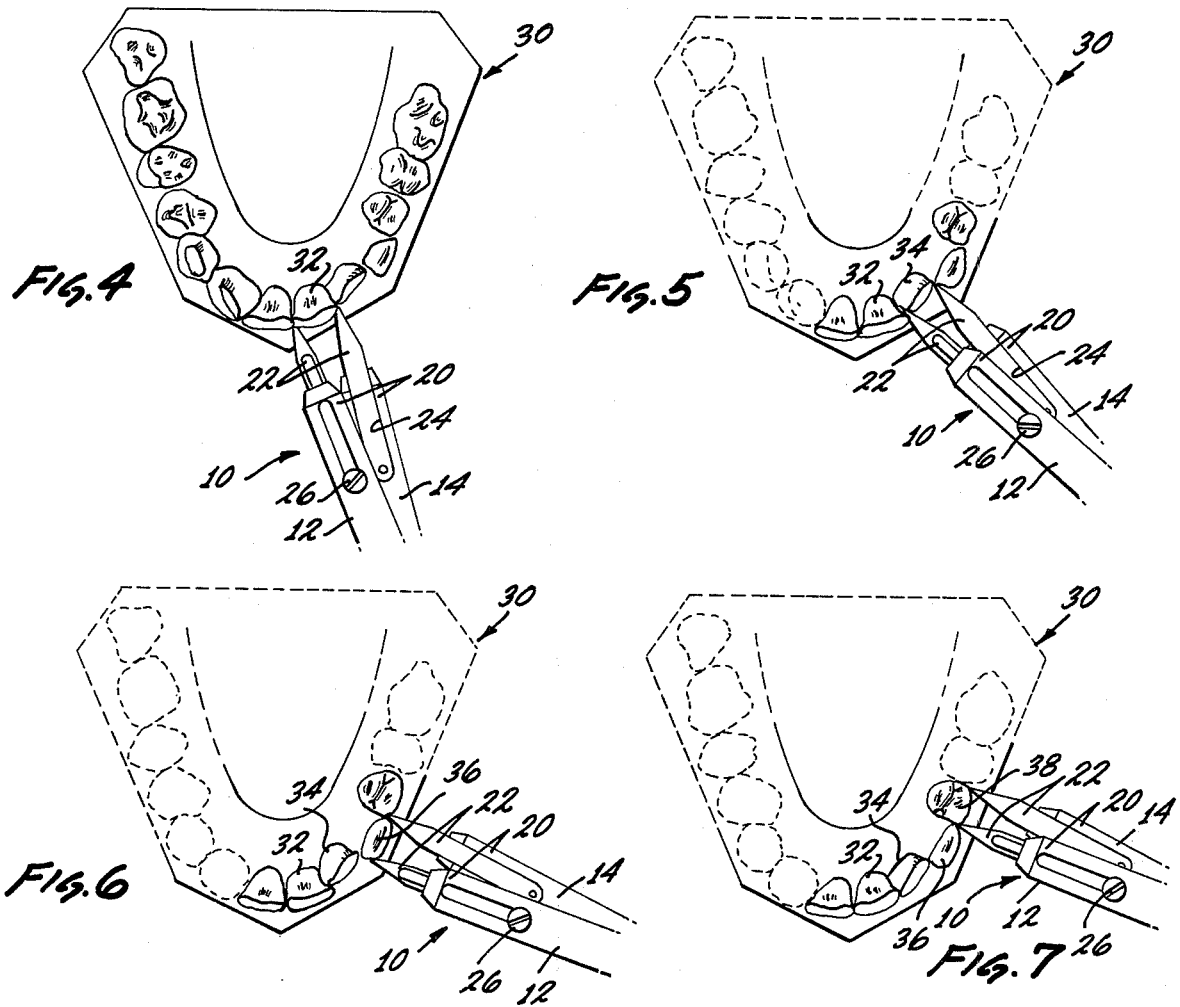
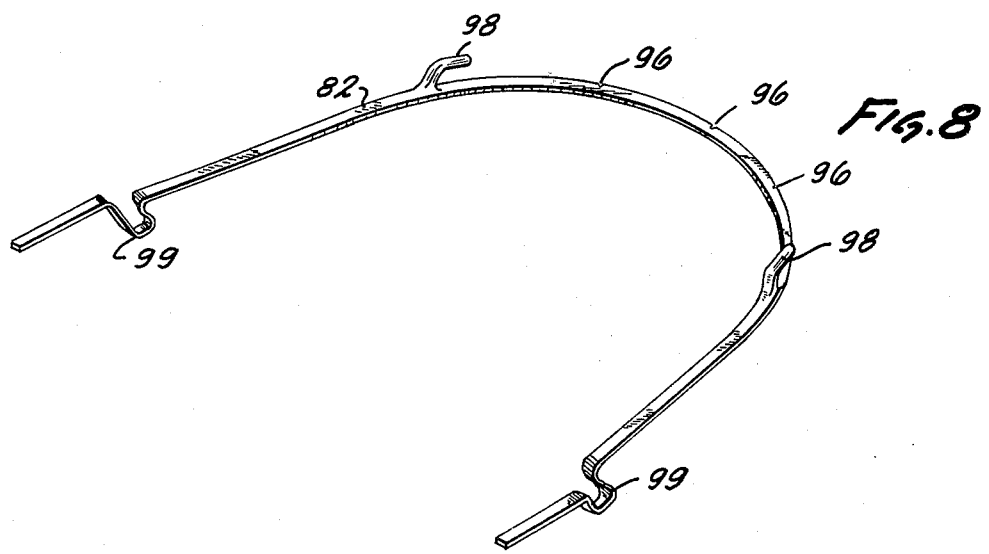

US Patent  Sept. 23, 1975  Sheet 3 of 3  3,906,634
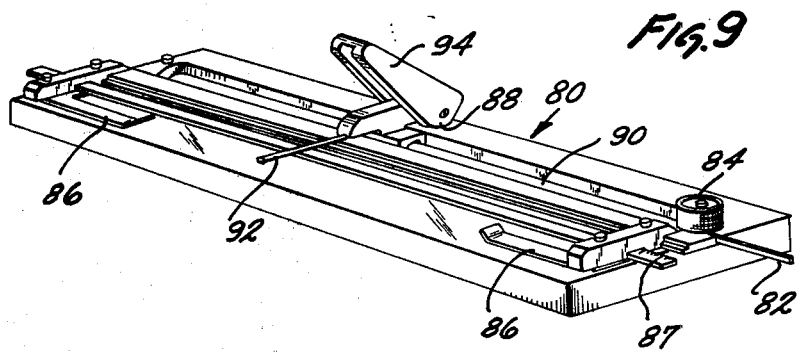
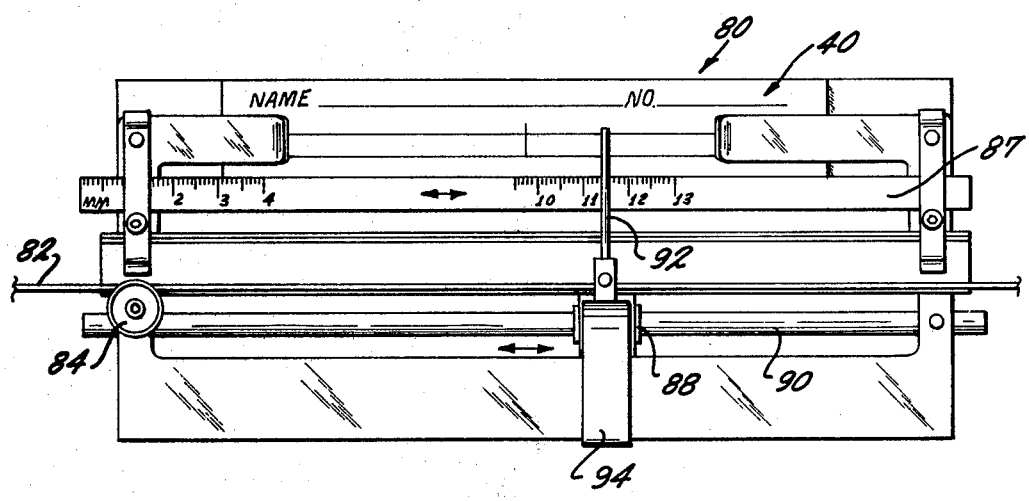
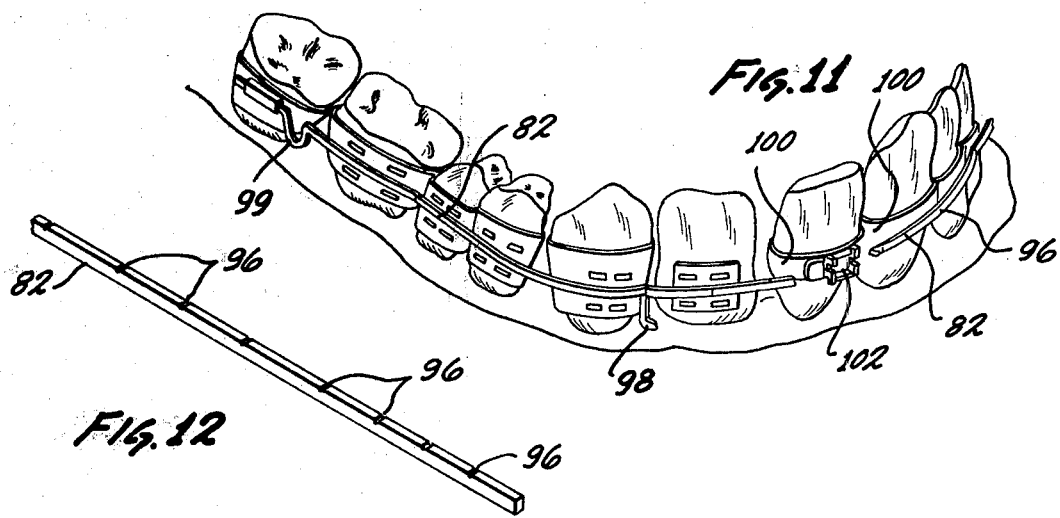

METHOD OF MARKING ARCHWIRE WITH TOOTH WIDTH MEASUREMENTS

BRIEF SUMMARY OF THE INVENTION AND OBJECTIVES

My invention is in the field of orthodontics and relates to marking of teeth widths on an archwire in a manner compensating for factors dictating increase in teeth measurements on the archwire and, more specifically, relates to the use of proportional dividers to save time in these operations.

In orthodontic work, the process has been tedious of marking an archwire with tooth widths and of compensating for factors requiring increases or dimensions in the course of this work. Prior methods also have been particularly susceptible to errors and inaccuracies, and are more time consuming for the orthodontist and other persons involved in forming the archwire.

My prior patent, U.S. Pat. No. 3,667,129, issued June 6, 1972, entitled "Orthodontist Wire Marking Device," covered apparatus for facilitating this process. As described in that patent, however, the process of increasing tooth width dimensions still required mental and physical operations that are time-consuming and subject to mistake.

The objectives of my invention include: to devise a method of automatically compensating for the desired increases in dimensions in transferring measurements of tooth widths from a patient's model to an archwire; to provide such a method that will save time, will be accurate and will reduce errors; and to devise such a method that will be economical in terms of equipment cost and maintenance and will be less physically and mentally tiring to operate.

My invention will best understood, together with additional objectives and advantages thereof, from the following description, read with reference to the drawings, in which:

FIG. 1 is a perspective view of a step in my invention in which the width of a right central incisor in a patient's model of an upper set of teeth 15 being measured with one end of proportional dividers.

FIG. 2 is a top view showing transfer of measurements to an archwire card with the other end of the proportional dividers.

FIG. 3 is an enlarged top view of a portion of an archwire card.

FIG. 4 is a top view of a step in my invention in which the width of a right central incisor is being measured, as in FIG. 1.

FIG. 5 is like FIG. 4 only a right lateral incisor is being measured.

FIG. 6 is like FIG. 5 only a right cuspid is being measured.

FIG. 7 is like FIG. 6 only a right bicuspid is being measured.

FIG. 8 is a perspective view of an archwire having Class II hooks soldered in place and being bent to form stops.

FIG. 9 is a perspective view of apparatus for transcribing measurements from an archwire card to an archwire. This apparatus was further shown in my referenced prior U.S. Pat. No. 3,667,129.

FIG. 10 is a top view of the apparatus shown in FIG. 9.

FIG. 11 is a perspective view showing a portion of an archwire and associated teeth.

FIG. 12 is a perspective view of a portion on an archwire after marking but before forming operations.

My invention involves the use of proportional dividers to automatically compensate for desired increases in dimensions in transferring measurements of tooth widths from a patient's model to an archwire. Such increase in dimensions are needed because of several reasons. An archwire, fitting to the outside of the patient's teeth, necessarily has a greater length, i.e., if the patient's front teeth are considered to be essentially arcuate in relative disposition, the archwire will form an outer arc of greater circumferential length. These arcs will be further spaced by band thicknesses and the bands, extending between teeth, cause limited spacing of teeth. A tooth measurement is taken from edge to edge, a straight-line distance, rather than around the curved front portion of the tooth. In other words, chordal rather than arcuate distances are measured. The orthodontist may shape, bend and personalize the archwire responsive to factors such as the natures of the patient's teeth, their initial dispositions, and the desired orientations. Shaping of an archwire, to deviate from an idealized arc, increases its length.

I have discovered that, if proportional dividers are set at a ratio of about 6.0:7.2, this will be the right setting in transferring tooth width measurements from a patient's model to an archwire and in increasing dimensions in the process. Although ordinary calipers or dividers have been used before in measuring tooth widths and in transferring the measurements to an archwire card or directly to an archwire, to my knowledge proportional dividers have not been used for that purpose. Where calipers or simple dividers have been used in the past, the tooth width measurements have been applied to an archwire card or to an archwire and then a scale has been used to measure in making further allowances between tooth width measurements for the needed extra archwire length. That prior process will be understood to be tedious, time-consuming, and subject to errors and inaccuracies. Automatic increasing of measured dimensions save time, is more accurate, is less susceptible to error, and is less physically and mentally exhausting. It is my estimate that 20 to 30 minutes a day could be saved of the time of an orthodontist and associated technicians through the use of my new method, in the operation of a typical orthodontic office.

My prior U.S. Pat. No. 3,667,129 further describes prior practices and describes the use of an archwire card on which measurements are recorded prior to marking on an archwire.

In the above discussion, the expression was used relative to the proportional dividers of setting them at "a ratio of about 6.0:7.2." Because especially of different personalizations of archwires among orthodontists, different widths and thicknesses of brackets used, different thickness of bands used, etc., offices will differ somewhat as to the ratio of increased dimensions from patients' models to archwires. The above expression is defined as covering ratios between 6.0:6.8 and 6.0:7.6, as this seems to cover the range of differences in practices in orthodontic offices.

A pair of proportional dividers 10, which was manufactured especially for use in my invention, is shown in the drawings particularly in FIGS. 1 and 2. Dividers 10 have two members 12, 14 secured together and pivoted about a central screw 16. One end 18 of each member 12, 14 is of fixed length (about 3 1/8 inches in one model) and the other end 20 is adjustable in length (from about 2 9/16 inches to about 3 1/8 inches in the same model). Adjustability of end 20 is obtained by a slide 22 adjustable along groove 24 and set in position by screw 26.

To obtain changing dimensions in use, slides 22 are appropriately set at something less than full extension (presuming both ends 18, 20 are the same length when slides 22 are fully extended). For example if a 6.0:7.2 ratio were desired, one way to set the slides would be to spread ends 18 to 7.2 inches on a scale and then adjust slides 22 in extension to read 6.0 inches on the scale. With the dividers described (in which ends 18, 20 are of the same length when slides 22 are fully extended) that slides 22 will have to be adjusted to less than maximum extension, i.e., when end 18 reads 7.2, end 20 should read 6.0. In transferring measurements, end 20 should be used to take tooth measurements from the patient's model and end 18 should be used to apply measurements to the archwire or the archwire card, as this procedure will result in increasing dimensions according to the ratio set in proportional dividers 10.

A plaster model 30 of a patient's upper set of teeth is shown in FIG. 1 and 4 – 7. The width of a right central incisor 32 is being measured with end 20 of dividers 10 in FIG. 1 and 4. The width of a right lateral incisor 34 is being measured in FIG. 5. The width of a right cuspid 36 is being measured in FIG. 6. The width of a right bicuspid 38 is being measured in FIG. 7. Biscuspid measurements should be applied with end 20 of the dividers to an archwire or to an archwire card, as bicuspids do not involve such radiuses that the 6.0:7.2 ratio applies, i.e., any allowances beyond nominal dimensions will be applied with a metric scale.

These measurements could be transferred, with end 18 of dividers 10 (except in the case of the bicuspid), directly to an archwire, with the use of appropriate marking material or by scratching the wire to record measuremets. I prefer, however, to use an archwire card 40. Card 40 has spaces for recording of the patient's name and number. A vertical line 42 represents the division between right and left in the patient's mouth, i.e., according to my practice, measurements of teeth on the right side of the patient's mouth are recorded on the right side of line 42 and measurements of teeth on the left side of the patient's mouth are recorded on the left side of line 42. Top line 44 represents upper teeth and lower line 46 represents lower teeth. Card 40 also has legends to be checked to indicate whether or not extraction of teeth are involved with the particular patient. The expression "Anterior Ratios L/U" deals with an orthodontic matter not concerned with the present invention.

FIG. 2 indicates the recording of the measurement (proportionally wider) of the width of a left upper tooth by puncturing card 40 with the sharp ends of divider 10. The enlarged view FIG. 3 shows in more detail the recording on line 44 of the length of archwire needed to cover the mesial-distal width of the left upper central incisor at 50, the width of the left lateral incisor at 52, the width of the left cuspid at 54, and the width of the left bicuspid at 56. The paired dashed diagonal lines 58, 60, 62, 64 represent the position of end 18 of dividers 10 for each of the above width measurements respectively (except for the bicuspid wherein end 20 would be used). Corresponding widths of the left lower central incisor, lateral incisor, cuspid and bicuspid are indicated on line 46 at 66, 68, 70 and 72. A metric scale 74 is also marked on card 40. The illustration of card 40 follows the convention the right and left of the card relates to right and left of the patient's mouth and the recording illustrated is of teeth on the left side of the patient's mouth. Some orthodontists instead may follow the convention that right and left relates to right and left of the orthodontist as he views the patient's mouth, in which case the right side of the card as viewed would represent right instead of left teeth.

The patient's archwire card 40 is useful in transferring measurements to an archwire even without the use of the apparatus shown in FIGS. 9 and 10, as the measurements recorded on card 40 (usually by puncturing with the sharp ends of the dividers) form a permanent record and the measurements transferred to the archwire can be rechecked in the process of marking the archwire. The same card may be used in the process of forming of additional archwires, i.e., each patient may have three to eight lower and three to eight upper archwires during the course of treatment.

The use of the FIGS. 9 and 10 apparatus 80 will be useful in accurate marking of archwires and for minimizing time required. As before indicated, apparatus 80 was the subject of my prior U.S. Pat. No. 3,667,129. As the structure and use of the apparatus was fully explained in that patent, I will only briefly indicate how the apparatus is constructed and used herein as the prior patent can be consulted for more details.

The archwire 82 is secured in a position extending longitudinally of apparatus 80 by a cam locking device having an operating knob 84. The patient's card 40 is secured in position extending longitudinally of apparatus 80 by clips 86. In FIGS. 9 and 10 I show the use of a separate metric scale 87 in accordance with the prior patent, although, as indicated by FIGS. 2 and 3, I now prefer to print this scale directly on card 40 at 74.

A sliding mechanism 88, mounted on a rod 90, has a pointer 92 which can be aligned with tooth width markings on card 40. To transfer such a marking to archwire 82, an operating handle 94 is pressed, whereupon archwire 82 is marked by a device on sliding mechanism 88, not shown, either slightly indenting the upper surface of archwire 82 or otherwise recording marks with ink or the like.

FIGS. 8 and 12 show such indentations 96 on archwire 82. The metric scale, whether separate from card 40 as at 87, or as integrated with card 40 at 74, was particularly useful, before my invention of the use of proportional dividers, in measurements dealing with allowances for the need of greater dimensions on the archwire than are obtained from direct measurement from the patient's model. It will be understood that according to prior practice, the tooth width measurement recorded on lines 44, 46 on card 40 (or directly on archwire 82) were actual tooth widths. Although such metric scale is not needed generally for such allowances with my use of proportional dividers, it is useful for other orthodontic purposes in measurements responsive to particular patient conditions and to operations of the orthodontist other than merely allowing for greater archwire widths, i.e., measurements for loops of various types, molar offsets, elevation or depression of teeth, etc., may be made according to the practices of the particular orthodontist.

In FIG. 8, hooks 98 are shown soldered to archwire 82 and the archwire is bent to form stops 99. FIG. 11 shows the use of archwire 82 in a typical application in which bands 100 are applied to teeth and archwire 82 secures to brackets 102 on bands 100.

TECHNIQUE OF PRE-FORMING ARCHWIRES

With the use of proportional dividers 10 archwires can be marked accurately, so that offset bends and loops can be placed or hooks soldered without the customary intraoral marking of the archwire, or wax registration of the teeth, or other time-consuming methods of marking. The archwire can be 75% to 85% performed for each patient.

The procedure involves the transfer of the M-D (mesial to distal) tooth width measurements to a straight edgewise archwire. Proportional dividers 10 are used to transfer the tooth measurements from the patient's models to the archwire. The proportional divider is used because the archwire has a greater circumference or M-D length, in the anterior section, than the circumference or sum of the M-D widths of the teeth represented by the archwire. By trial and error it has been determined that for every 6 mm of M-D anterior tooth width, approximately 7.2 mm of wire is needed. Therefor the dividers are set to this approximate 6.0:7.2 ratio. The steps in pre-forming the archwire are as follows:

1. The tooth measurements are transferred from the patient's models to patient's archwire card 40 by using proportional dividers 10. The dividers work best if they are held in the palm of the hand, and they are opened and closed using the thumb and index finger, rather than if a pencil grip is used. Measure, with the adjustable ends 20 of the dividers, the M-D width of the left central incisor. Now, transfer this M-D width to the patient's archwire card by poking holes in the card, using the longer opposite ends 18 of the proportional dividers. Start at the midline. Next, measure the right central incisor and place its proportional width adjacent to the midline. Next, measure the lateral incisor and cuspid teeth and step off their proportional lengths on the card. In extraction cases, the six anterior teeth are all that need be marked off.

2. Next, the patient's archwire card is placed in the archwire marker 80.

3. Next, the rectangular wire 82 to be marked is placed in the archwire marker in the following manner:
   a. The wire is held so that the long dimension is vertical. The wire is then slid past the open cam into the marker on its edge.
   b. The wire is slid under the marking device. It is best to pull the handle or lever part of the marking device back to allow the wire to pass freely beneath the marking device.
   c. The cam is tightened with knob 84.

4. Next, the wire is to be marked by depressing the lever arm 94 firmly forward. First, depress the marker lever at the midline. Then depress at each of the other marks on the patient's archwire card.

5. After wire 82 is marked, it is removed, and formed with either a plain or a torquing turret. An archwire is now provided that has marks 96 placed so that hooks or loops can be accurately placed, and so that offset and finishing bends can be placed prior to the patient's arrival. The final torque adjustments and personalization of the wire are made by the orthodontist at the dental chair.

The archwire 82, as marked by the above instructions, carries the archwire to rear completion past the cuspid teeth.

Additional Markings and Placement of the Tie Back Posts or Molar Offsets

In a non-extraction case, the bicuspids can also be measured off on the patient's archwire card. The proportional dividers 10 need not be used for measuring bicuspids because the ratio of archwire length to tooth size is nearly 1.0:1.0. To allow for a molar offset, the archwire marker 80 must be depressed ½ mm to 2 mm past the point that represent the 2nd bicuspid-first molar embrasure. This is done by using the metric scale 87 on the archwire marker or the metric scale 74 on card 40. The added ½ mm to 2 mm varies somewhat from one practice to another due to different types of buccal tubes used and individual preference as to the amount of offset desired.

In extraction cases, the amount of space to be closed with closing loops is impossible to measure at the beginning of treatment, because some of the space is closed by realigning rotated teeth, and by anchorage loss and by unpredictable amounts of tooth movement into the extraction sites. Therefore, the measurement and marking of the wire in the posterior section for the purpose of locating a tie back is most accurately measured when the closing loop stage is reached.

The location of the tie back post is determined directly in the patient's mouth at the appointment prior to the appointment when the closing loop wire will be seated. The location is determined by using dividers, and measuring from the point or embrasure where the loop will be positioned to that point in the patient's mouth where the post will be located. In most offices, in the upper arch, the distance between the closing loop and the tie back post would be the distance from a point approximately 1 mm distal of the lateral incisor brackets to a point just distal to the second bicuspid bracket.

The measurement is transferred to the patient's prescription blank or archwire card by poking holes in it with the dividers. Then, this measurement is transferred directly to the patient's archwire from the prescription blank using a wax pencil or a file, after the anterior portion has been formed as in the preceding instructions. If depression, elevation, inset or offset of a particular tooth or group of teeth is desired, the amount and location of depression, elevation, etc., is indicated by prescription and that additional amount is added to the archwire by using the metric scale in the indicated location.

The above discussion gives some information on additional markings of an archwire for placement of the tie back posts, or molar offsets, and the method of allowing for increased length wire so that special unordinary bends may be placed in an individual's archwire to properly position his teeth. Orthodontists and associated technicians will understand application of my invention to their operations and modifications thereof to adapt to their particular procedures and preferences. My invention concerns the method of marking archwires with the use of proportional dividers to transfer certain tooth width measurements in a manner increasing measurements to allow for certain factors such as the greater circumferential length of the archwire relative to the combined widths of associated teeth, but I have discussed or illustrated associated matters, equipment and procedures in order to put my invention in context and to facilitate application of my invention.

Whereas I have illustrated a rectangular archwire, the invention applies equally to square or round archwires.

Having thus described a specific embodiment of my invention, I do not want to be understood as limiting myself to all details shown but instead I want to cover all matters properly within the scope of my invention.

I claim:

1. The method of marking tooth width measurements, taken from a patient's model, on an archwire, comprising:
   a. providing proportional dividers and setting said dividers on a ratio of about 6.0:7.2,
   b. providing an archwire card and transferring tooth width measurements from said patient's model to said card by using said dividers in a manner increasing card measurements by said ratio, and
   c. transferring card measurements from said archwire card to said archwire and marking the measurements on said archwire.

2. The method of marking tooth width measurements, taken from a patient's model, on an archwire, comprising:
   a. providing proportional dividers and setting said dividers on a ratio of about 6.0:7.2, and
   b. transferring tooth width measurements from said patient's model to said archwire by using said dividers in a manner increasing archwire measurements by said ratio and marking the transferred measurements on said archwire.

* * * * *